April 15, 1930.  R. E. McGAHEY  1,754,723
GREASE GUN CONNECTION
Filed Oct. 16, 1928
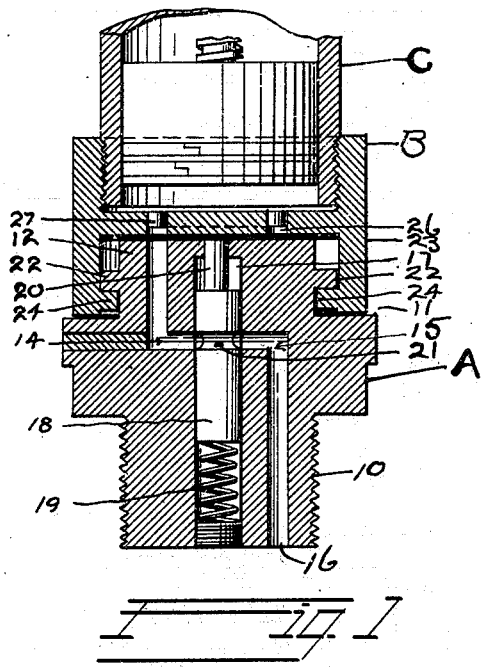
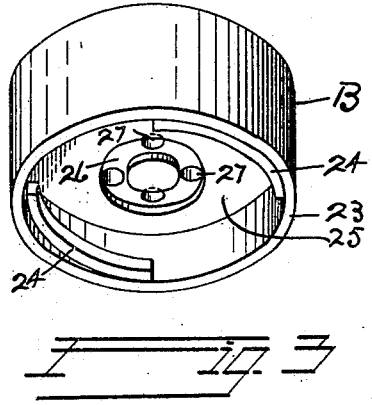
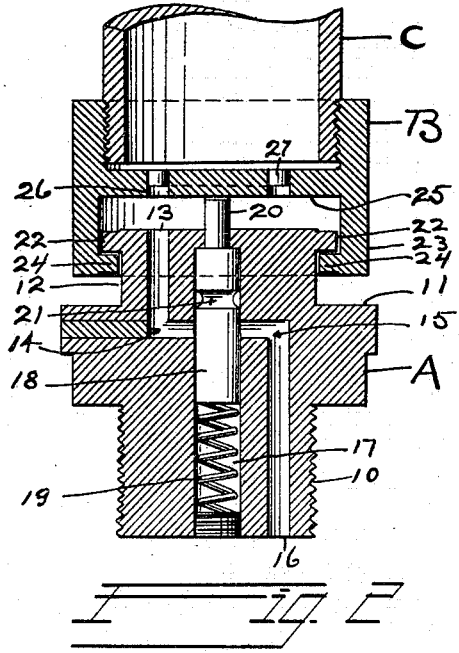
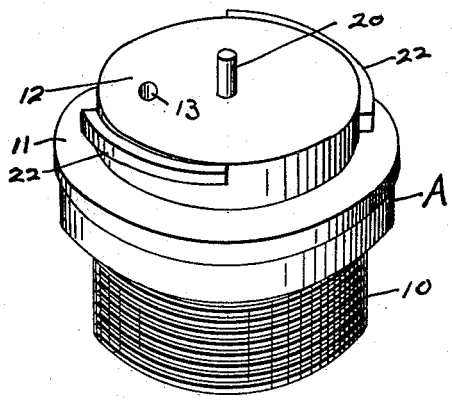
Inventor
Robert E. McGahey
By
L. L. Morrill
Attorney Patented Apr. 15, 1930

1,754,723

UNITED STATES PATENT OFFICE

ROBERT E. McGAHEY, OF ALEXANDRIA, VIRGINIA

GREASE-GUN CONNECTION

Application filed October 16, 1928. Serial No. 312,813.

This invention relates to grease gun connections and has for an object to provide the necessary elements for the proper connection of a grease gun to the object to be greased, having special reference to large machinery such as locomotives or the like but obviously not limited in size in any particular.

A further object of the invention is to provide a grease gun embodying two separable sections forming a connection, one section of which is permanently attached to the machine to be greased, the other section forming a part of the grease gun installation with new and improved means for connecting the two parts.

A further object of the invention is to provide one unit adapted to be attached to the machine to be greased, said unit embodying a conduit and improved type of valve for closing the conduit with a second unit forming a part of the grease gun organization adapted to be attached to the first mentioned unit by improved means, and embodying means for moving the valve to open the conduit to form communication from the grease gun to the machine to be greased.

With these and other objects in view, the invention comprises certain novel parts, elements, units, combinations, constructions, interactions and functions, as disclosed in the drawings together with functional and mechanical equivalents thereof as will be hereinafter more fully described and claimed.

In the drawings:

Figure 1 is a view in diametrical section of the improved grease gun connection showing the units interconnected in operative relation.

Figure 2 is a similar diametrical view showing the parts in their relation as first united but before being moved to complete operative position.

Figure 3 is a perspective view of the unit which is attached to and preferably will form a part of the grease gun organization.

Figure 4 is a perspective view of the unit which is attached to the machine to be greased.

Like characters of reference indicate corresponding parts throughout the several views.

The improved grease gun connection which forms the subject matter of the present application comprises two units; A to be attached to the machine to be greased, and B to be attached to and preferably form a part of the grease gun organization which is diametrically indicated at C. The unit A comprises a threaded nipple 10 which is inserted in relation to the bearing to be greased in the usual well known manner. It also embodies a shoulder 11 with an upstanding central and preferably cylindrical part 12. The part 12 is provided with a conduit which enters the top of the cylindrical part at 13 and continuing downwardly in parallelism with the axis to form a right angled bend 14 extending then diametrically across the unit A, forming a second right angled bend 15 and terminating at 16 which is the opening to the bearing to be greased.

The diametrical section from 14 to 15 passes through an axial bore 17 in which is mounted to slide a valve 18, held normally and yieldingly to the upper limit of its movement by a spring 19 and with an upwardly extending spindle 20 which normally extends above the surface of the cylindrical part 12 of the unit A, as shown more particularly at Figures 2 and 4. The valve 18 is also provided with a circumferential furrow 21 which in its depressed position as shown at Figure 1 is in register with the diametrical part of the conduit, forming a continuation thereof but, when raised by the spring 19, is out of register with the conduit and, therefore, the conduit is closed by the valve in that position. The unit A is also provided with spirally positioned lugs 22, the function of which will be hereinafter more apparent. The unit B is provided with a sleeve 23 with internally positioned spiral lugs 24 properly positioned and proportioned to co-act with the lugs 22 so that a rotative movement of one unit relative to the other will serve to bind the base 25 of the unit B firmly and in grease-tight contact with the top of the cylindrical part 12 of the unit A.

The unit B is also provided with an annular groove or furrow 26 which is at all times in communication with the inlet 13 of the conduit irrespective of the relative rotary positions of the units A and B. Communicating with the annular groove 26 and through the base 25 of the unit B are a plurality of perforations 27, here shown as four in number, but it is to be understood that the number shown is no limitation upon the invention. Immediately above the base 25 of the unit B the grease gun barrel is attached so that the base 25 as assembled forms the bottom of the grease gun which, when organized, comprises the units B and C.

In operation, the valve 18 will normally be at its upward limit of movement as indicated at Figures 2 and 3. When the grease gun organization is applied, the sleeve 23 is slipped downwardly over the cylindrical part 12 of the unit A with the lugs 24 intervening between the lugs 22 and engaging under such lugs in the usual well known manner. A rotation of the unit B will cause the unit B and its associated grease gun to bind tightly upon the top of the cylindrical part 12 and in its downward movement will also force the valve 18 from closed position as shown at Figure 2 to open position as shown at Figure 1. By manipulating the force feed of the grease gun in any usual well known manner, the grease is forced from the gun part C through the perforations 27 into the annular groove 26 and following such groove enters the inlet of the conduit at 13, following thence downwardly through the conduit and about the valve 18 to the outlet at 16. Upon the completion of the grease operation, the unit B is released from the unit A by a reverse turn whereupon the spring 19 again forces the valve 18 to closed position as shown at Figures 2 and 4.

It has been the experience in the use of various grease gun structures, including their connections, that it is very difficult and in most cases impossible to form a sufficiently tight connection between the units of the connecting structure to prevent the exudence of grease from between the connecting parts when pressure is applied. By the use of the spiral lugs 22 and 24 and the close connection made between the top of the cylindrical part and the base 25, a completely grease-tight joint is effected which prevents the exudence of any grease about the structure and compels the grease under force to follow the prescribed channel to the bearing to be lubricated.

What I claim to be new is:

1. A grease gun connection comprising rotatably separable units, one unit providing a conduit, a valve mounted to slide longitudinally of the unit and transversely across the conduit and to open and close said conduit at the limits of its movement, a spindle carried by said valve and extending slidably through one of said units, means carried by the other unit for engaging the spindle and moving the valve, said last mentioned unit having a passage at all times in communication with the conduit at any relative rotary position of the parts.

2. A grease gun connection comprising a pair of rotatably interacting units, one of which embodies a conduit, a valve mounted to slide longitudinally of the unit and transversely across the conduit and provided with a passage properly positioned and proportioned to form a continuation of the conduit in one position, a spindle extending from said valve through and without the unit, the second unit being provided with a passage proportioned and positioned to at all times register with the conduit at any relative position of the units, interacting means carried by the units for interconnection, and means to close the valve when the units are disconnected.

3. A grease gun connection comprising interacting units, one of which is provided with a conduit adapted to communicate with the bearing to be lubricated, a valve mounted to slide axially of the unit and transversely across a part of the conduit, said valve being provided with a circumferential groove properly proportioned and positioned to register with the conduit at one limit of movement of the valve, a spindle upstanding from the valve and extending without the said unit, means carried by the second unit for binding the units in grease-tight connection, said second unit being provided with a passage at all times in connection with the conduit when the parts are interconnected, and a gun structure carried by said last mentioned unit and communicating with said passage.

4. A grease gun connection comprising a unit having a conduit extending therethrough, a valve mounted to slide in the unit and provided with means for opening and closing the conduit at different positions, a second unit, means for rotatably connecting the two units with their opposed end faces in abutting grease-tight relation, said last mentioned unit provided with a passage in communication at all times with the conduit at any relative rotary position of the parts, and provided with perforations through its face and extending into said passage, and means intervening between the units for actuating the valve when the units are connected.

In testimony whereof I affix my signature.

ROBERT E. McGAHEY.